Dec. 22, 1953 G. RAISBECK ET AL 2,663,796

LOW-INPUT IMPEDANCE TRANSISTOR CIRCUITS

Filed Nov. 9, 1950 2 Sheets-Sheet 1

$$\frac{i_L}{i_1} = \frac{n^2 r_e + (n^2+n) r_b + n r_m}{n^2 r_e + (n+1)^2 r_b + r_c + n r_m + R_L}$$

$$\frac{e_1}{i_1} = \frac{n^2[r_e r_b - r_m r_b + r_c r_e + r_c r_b + (r_e + r_b)(R_L)]}{n^2 r_e + (n+1)^2 r_b + r_c + n r_m + R_L}$$

INVENTORS. G. RAISBECK
R. L. WALLACE. JR.
BY Harry C. Hart
ATTORNEY

LOW-INPUT IMPEDANCE TRANSISTOR CIRCUITS

Filed Nov. 9, 1950 2 Sheets-Sheet 2

$$\frac{i_L}{i_1}=\frac{n^2 r_e+(n^2+n)r_b+nr_m}{n^2 r_e+(n+1)^2 r_b+r_c+nr_m+n^2 R_L}$$

$$\frac{e_1}{i_1}=\frac{r_e r_b-r_m r_b+r_c r_e+r_c r_b+n^2(r_e+r_b)R_L}{n^2 r_e+(n+1)^2 r_b+r_c+nr_m+n^2 R_L}$$

INVENTORS. G. RAISBECK
R. L. WALLACE. JR.
BY Harry C. Hart
ATTORNEY

Patented Dec. 22, 1953

2,663,796

UNITED STATES PATENT OFFICE 2,663,796

LOW-INPUT IMPEDANCE TRANSISTOR CIRCUITS

Gordon Raisbeck, Morristown, and Robert Lee Wallace, Jr., Plainfield, N. J., assignors to Bell Telephone Laboratories, Incorporated, New York, N. Y., a corporation of New York Application November 9, 1950, Serial No. 194,835

4 Claims. (Cl. 250—31)

This invention relates to transistor translating circuits, particularly amplifiers and detectors. It has for its principal object the provision of a transistor translating circuit of exceedingly small input impedance.

In three applications of R. L. Wallace, Jr., filed September 12, 1950, Serial Nos. 184,457, 184,458, and 184,459, respectively, of which the second one has now issued as Patent 2,620,448, December 2, 1952, it is explained that the transistor is more nearly the dual counterpart of a vacuum tube than its analog and that, when excellent performance is known to be obtainable from a particular circuit configuration of which a vacuum tube is an element, then comparable performance can be expected from a transistor circuit which is the dual counterpart of the known vacuum tube circuit and of which the transistor, itself an approximate dual of the vacuum tube, is an element.

Among the many vacuum tube circuits of known excellence, the so-called cathode-follower circuit is of great importance. This circuit, in which the load resistor is included between the cathode of the tube and ground, while the signal frequency impedance between anode and ground is reduced as far as possible, has the interesting property that its input impedance is exceedingly high while it can deliver substantial amounts of output power. These properties are known to be connected with the fact that the circuit inherently embodies negative feedback by way of the cathode resistor inasmuch as the grid-to-cathode voltage is the difference between the input voltage and the output voltage.

In the case of transistor amplifiers, which are primarily current amplifying devices, like purposes may be served by an amplifier whose input admittance, as distinguished from its impedance, is as large as possible and which, at the sacrifice of some current gain, can deliver substantial amounts of output power.

The present invention furnishes just such an amplifier. It comprises a transistor amplifier of the grounded emitter configuration in which a phase-reversing device, e. g., a transformer, is included either in the emitter lead or in the collector lead. The resulting amplifier is characterized by the desired very high input admittance.

The phase-reversing transformer compensates for the fact that among the major differences between circuits of the transistor type and corresponding dual circuits of the vacuum tube type are the phase inversion which holds in the case of the one and does not hold in the case of the other. When the duality transformations taught by R. L. Wallace, Jr., in the aforementioned applications are applied to a conventional cathode follower vacuum tube amplifier it turns out that the requirements of the transformation cannot all be satisfied without the introduction of a transformer of unity turns ratio, or other phase-reversing device, either in series with the emitter or in series with the collector of the transistor.

The invention in another aspect provides a still further reduction of the input impedance of the device by the inclusion of a resistor in series with the emitter lead or the base lead of the transistor, which resistor is itself proportioned in relation to the internal transistor parameters and to the turns ratio of the transformer.

The invention will be more fully apprehended from the following detailed description of preferred embodiments thereof taken in conjunction with the appended drawings in which.

Figure 1:
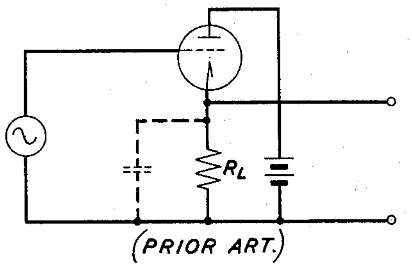
Fig. 1 is a simplified schematic diagram showing a vacuum tube amplifier of the well-known cathode follower variety.
Figure 2:
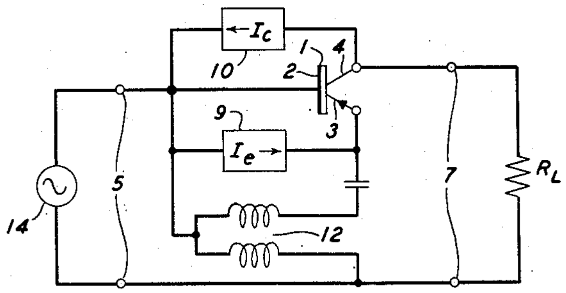
(PRIOR ART) FIG. 2
Fig. 2 is a schematic diagram showing a transistor amplifier which is the dual counterpart of the vacuum tube amplifier of Fig. 1.
Figure 3:
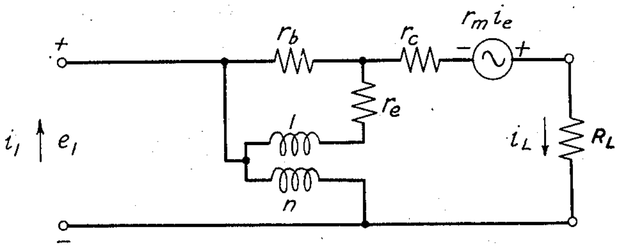
Fig. 3 is an equivalent circuit diagram of the transistor amplifier of Fig. 2 and contains the improvements furnished by the invention in mathematical form.
Figure 4:
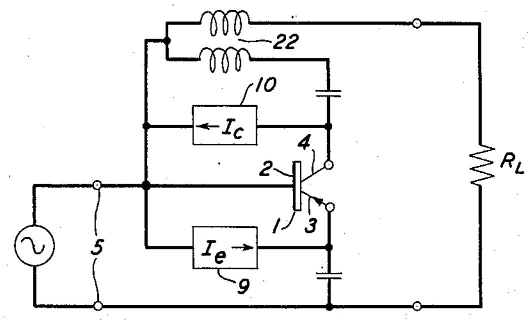
Fig. 4 is a schematic diagram of a variant of Fig. 2.

Referring now to the drawings, Fig. 1 shows a conventional vacuum tube amplifier of the cathode-follower configuration. A condenser is shown in broken lines as shunting the cathode resistor. When this condenser is included, the time-constant of the resistor and the condenser being properly selected, the circuit becomes a detector. As is well known, the cathode follower is characterized by a very high input impedance, a voltage gain of slightly less than unity, and a relatively low output impedance. When the defining equations for this circuit are set down and the duality transformations described in the aforementioned Wallace applications are applied to them, it turns out that the resulting dual equations can be satisfied with a transistor only by the inclusion of a transformer or other phase-reversing device. Fig. 2 shows the transistor circuit which results from synthesizing the dual equations with the transformer in the emitter lead, while Fig. 4 shows the result with the transformer in the collector lead. Referring to the first form, Fig. 2 shows a transistor having a semiconductive body 1, a base electrode 2, an emitter 3 and a collector 4, input terminals 5 connected to the base 2 and the emitter 3, output terminals 7 connected to the emitter 3 and the collector 4, an emitter current source 9, a collector current source 10, a phase-reversing transformer 12 in series with the emitter, a signal source 14 connected to the input terminals 5 and a load $R_L$ connected to the output terminals 7. Fig. 3 is the equivalent circuit diagram of Fig. 2, drawn in the manner described by Ryder and Kircher in the Bell System Technical Journal for July 1949, page 376. The circuit equations for Fig. 3, and therefore for Fig. 2 are:

$$i_1(nr_e+nr_b)-i_L[nr_e+(n+1)r_b]=\frac{e_1}{n}$$

$$i_1(nr_e-nr_m)-i_L[nr_e-r_c-nr_m-R_L]=\frac{n+1}{n}$$

where:

$e_1$=input current
$i_L$=load current
$e_1$=input voltage
$r_e$=emitter resistance
$r_b$=base resistance
$r_c$=collector resistance
$r_m$=emitter to collector transfer impedance
$R_L$=load resistance
$n$=turns ratio of transformer From these it is easy to determine the current gain and the input impedance. The values of current gain $$\frac{i_L}{i_1}$$

and input impedance $$\frac{e_1}{i_1}$$

are given below the figure. In this analysis a generalized turns ratio has been used for the transformer, rather than a turns ratio of unity, which would correspond to the exact dual counterpart of the circuit of Fig. 1.

The operation of the circuit of Fig. 2 may be explained as follows: Consider the input current from the signal source 14 to increase positively. This tends to drive the base-to-ground voltage in the positive direction, and hence, because of the transformer 12 the emitter current rises. This causes the collector impedance to fall, and hence the base-to-collector voltage tends to fall. The load current tends to rise, and the voltage across the load $R_L$ rises. The input voltage is the sum of the load voltage and the base-to-collector voltage, and so rises less than the load voltage because of the fall in base-to-collector voltage. The effect of this diminution in the input voltage rise for a given input current is to cause the effective input impedance to be very low.

Figure 5:
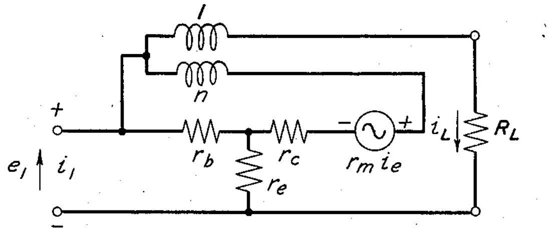
Fig. 5 is an equivalent circuit diagram of the transistor amplifier of Fig. 4, and contains also a concise statement of the improvements derivable from this form of the invention in mathematical form.

Fig. 4 shows an alternative to Fig. 3 wherein the phase-reversing transformer 22 is connected in series with the collector 4. Fig. 5 shows its equivalent circuit. Its defining equations, in which the symbol definitions are as before, are:

$$i_1(r_b+r_c)+i_L\left(-r_c-\frac{n+1}{n}r_b\right)=e_1$$

$$i_1[-n^2r_e-(n^2+n)r_b-nr_m]+i_L[n^2r_e+r_c+(n+1)^2r_b+nr_m+n^2R_L]=0$$

The values of the current gain $$\frac{i_L}{i_1}$$

and of the input impedance $$\frac{e_1}{i_1}$$

derived from these equations are shown below the figure.

The reason that the expressions for gain and input impedance are not the same in the two cases is that, although both were developed as duals of the same circuit, Fig. 1, these different forms are dual counterparts of the cathode follower only if $n=1$, and in this case the various expressions are alike. Furthermore, if $n=-1$ the circuits are simply grounded emitter transistor amplifiers, and the results are once again the same, and also in harmony with the results of Ryder and Kircher, Bell System Technical Journal, July 1949, page 376.

The expressions for gain and input impedance can be simplified in the case $n=1$. They reduce approximately to $$\frac{i_L}{i_1}=\frac{r_m}{r_m+r_c+R_L}$$

and $$\frac{e_1}{i_1}=\frac{(r_e+r_b)(R_L+r_c)-r_mr_b}{r_m+r_c+R_L}$$

This last expression for input impedance clearly depends quite strongly on the relative magnitudes of $r_b$ and $r_e$, the internal base resistance and the internal emitter resistance of the transistor. Advantage may be taken of this dependency to adjust the input impedance to any desired value within a certain range, simply by padding $r_b$ and $r_e$ as required. For example, suppose that a typical transistor is employed, having $r_e$=200, $r_b$=200, $r_m$=30,000, $r_c$=20,000, $R_L$=5000. Then the gain is .55 and the input impedance is 71 ohms. If, however, an additional resistance of 800 ohms is added in series with the base, the gain is reduced to about .54 and the input impedance is reduced to about 3 ohms. The magnitude of the output impedance is approximately $r_c+r_m$.

It may be said of the circuits of Fig. 2 and Fig. 4 that they are amplifiers with a current gain of somewhat less than 1 and with a low input impedance and a high output impedance.

Figure 6:
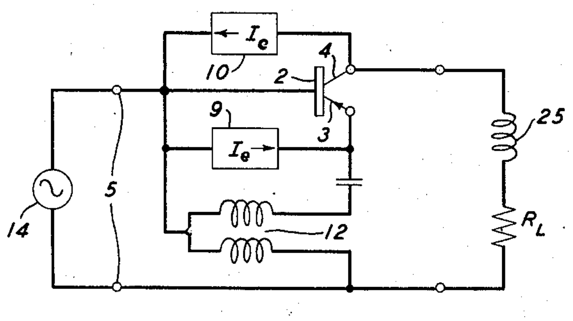
Fig. 6 is a schematic circuit diagram showing an extension of Fig. 2 to a detector.

The invention is easily extended, as illustrated in Fig. 6, to detectors by the introduction of a coil 25 which is the dual counterpart of the broken line condenser of Fig. 1.

The operation of the circuit of Fig. 6 may be explained as follows: The emitter bias current $I_e$ is first to be adjusted approximately to collector voltage cut-off. Assume that a signal-modulated carrier wave is applied to the input terminals 5. Each negative peak of the signal applied to the base is converted by the transformer 12 into a negative current change at the emitter 3, and this causes the collector resistance to increase and induces on it a large negative voltage. A current then starts to flow through the inductance coil 25. When the polarity of the input signal reverses, the collector resistance falls again to a low value and the current stored in the inductance coil 25 decays at a rate determined by the time constant of this inductance coil in combination with the load resistor $R_L$. These elements are to be proportioned to make this time constant intermediate between the period of the carrier waves and the period of the modulating waves. The current stored in the inductance coil 25 is opposite in direction to the collector power supply current $I_C$. It remains large enough to hold the collector contact of the transistor in a highly conducting condition for the greater part of the time, increasing and decreasing with the envelope of the applied signal. The fluctuations of the current, flowing through the load resistance $R_L$, constitute the output of the detector, while the undesired high-frequency component fails to be reproduced by reason of the fact that the circuit is self-biasing to collector voltage cut-off in a continuous fashion.

What is claimed is:

1. Signal-translating apparatus which comprises a transistor having an emitter electrode, a collector electrode, and a base electrode, said transistor being characterized by collector output current which is a substantial replica of, and in phase with, its input emitter current, an autotransformer having two extreme terminals and an intermediate terminal, a load, said autotransformer and said load being connected, by way of the extreme autotransformer terminals, in series between the emitter electrode and the collector electrode, said intermediate autotransformer terminal being directly connected to the base electrode, and a source having two terminals connected, respectively, to the base electrode of the transistor and to that terminal of the load which is the more remote from the collector electrode of the transistor.

2. Apparatus as defined in claim 1 wherein said load is connected between said autotransformer and said collector electrode.

3. Apparatus as defined in claim 1 wherein said load is connected between said autotransformer and said emitter electrode.

4. Apparatus as defined in claim 1 wherein said load comprises a series-connected combination of a resistor and an inductance coil, the time constant of said coil and said resistor, taken together, being intermediate between the period of carrier waves and the period of modulating signals, whereby said apparatus is operative as a detector for signal-modulated carrier waves applied to said input terminals.

GORDON RAISBECK.
ROBERT LEE WALLACE, JR.

References Cited in the file of this patent

UNITED STATES PATENTS

| Number | Name | Date |
|---|---|---|
| 1,820,114 | Black | Aug. 25, 1931 |
| 1,908,381 | Travis | May 9, 1933 |
| 2,517,960 | Barney et al. | Aug. 8, 1950 |
| 2,524,035 | Bardeen et al. | Oct. 3, 1950 |
| 2,541,322 | Barney | Feb. 13, 1951 |
| 2,556,286 | Meacham | June 12, 1951 |
| 2,556,296 | Rack | June 12, 1951 |

OTHER REFERENCES

Terman text "Radio Engineering," 3d ed., pp. 301–302, Pub. 1947, by McGraw-Hill Book Co., New York. Copy in Div. 69.